United States Patent [19]

Igenbergs

[11] Patent Number: 5,285,763
[45] Date of Patent: Feb. 15, 1994

[54] SYMMETRICAL RAILGUN

[75] Inventor: Eduard Igenbergs, Munich, Fed. Rep. of Germany

[73] Assignee: Igenwert GmbH, Munich, Fed. Rep. of Germany

[21] Appl. No.: 939,566

[22] Filed: Sep. 3, 1992

Related U.S. Application Data

[63] Continuation of Ser. No. 458,711, Mar. 21, 1990, abandoned.

[30] Foreign Application Priority Data

Jun. 6, 1988 [DE] Fed. Rep. of Germany ....... 3819185

[51] Int. Cl.⁵ .............................................. F41B 6/00
[52] U.S. Cl. .............................................. 124/3; 89/8
[58] Field of Search .................... 124/3; 89/8; 310/10–14; 315/5.41, 5.42, 3

[56] References Cited

U.S. PATENT DOCUMENTS

| | | | |
|---|---|---|---|
| 1,422,427 | 7/1922 | Fauchon-Villeplee | 124/3 |
| 4,480,523 | 11/1984 | Young et al. | 124/3 X |
| 4,534,263 | 8/1985 | Heyne et al. | 124/3 X |
| 4,555,972 | 12/1985 | Heyne | 124/3 X |
| 4,608,908 | 9/1986 | Carlson et al. | 124/3 X |
| 4,624,173 | 11/1986 | Creedon | 124/3 X |
| 4,864,911 | 9/1989 | McKee et al. | 124/3 X |
| 4,987,821 | 1/1991 | Kemeny et al. | 124/3 X |
| 5,133,242 | 7/1992 | Witt | 124/3 |

FOREIGN PATENT DOCUMENTS 0163745 11/1985 European Pat. Off. ............. 124/3

Primary Examiner—Randolph A. Reese
Assistant Examiner—Anthony Knight
Attorney, Agent, or Firm—Townsend and Townsend Khourie and Crew

[57] ABSTRACT

A symmetrical railgun is described which consists of at least four rails of electrically conductive material, which extend at the same spacing from and parallel to a predetermined axis of symmetry.

26 Claims, 7 Drawing Sheets

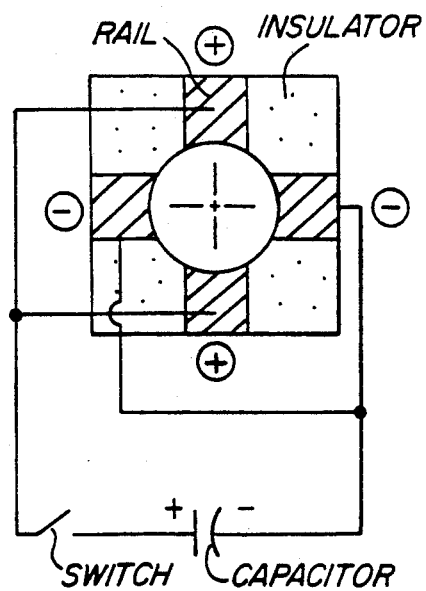
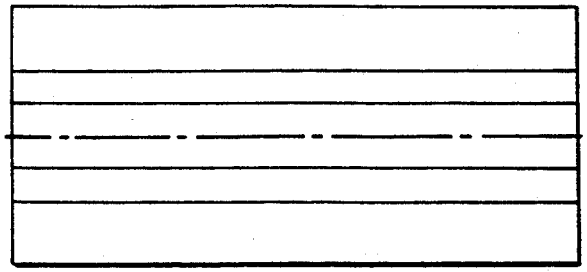
FIG. 1A.
FIG. 1B.
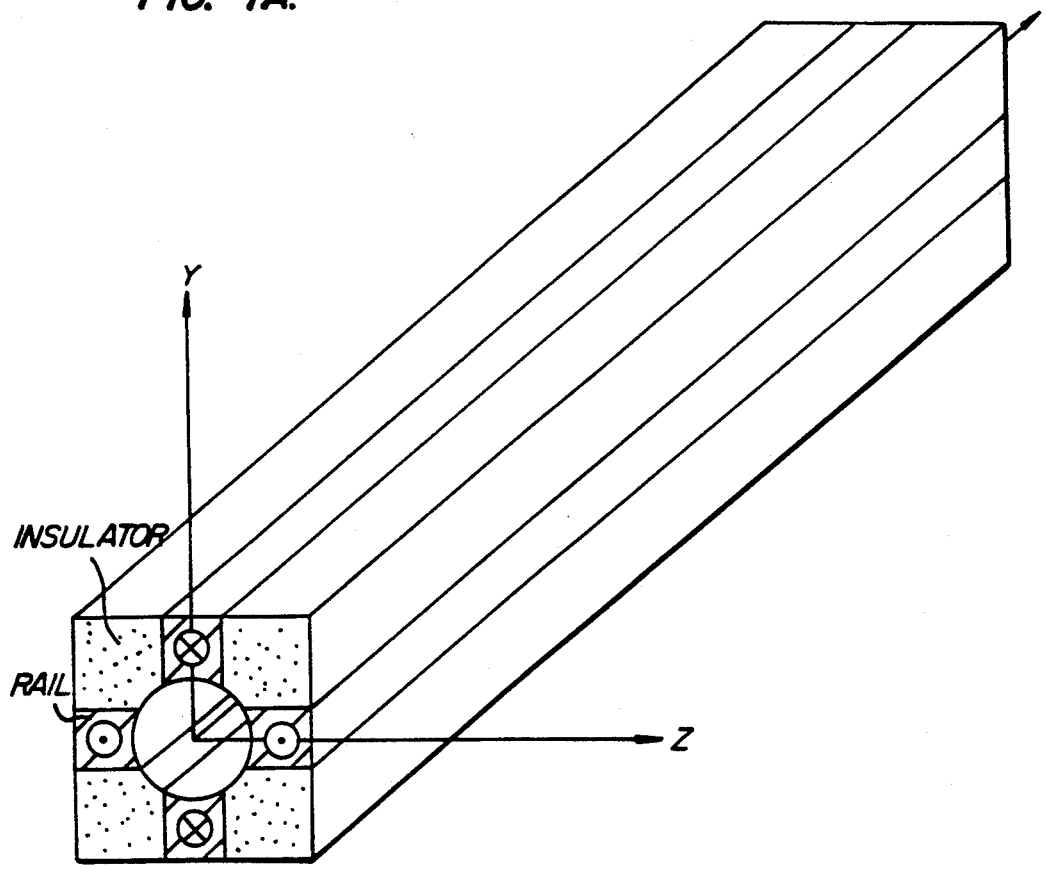
FIG. 1C.

SYMMETRICAL RAILGUN

This is a continuation of application Ser. No. 07/458,711 filed Mar. 21, 1990, now abandoned.

BACKGROUND OF THE INVENTION

The present invention relates to railguns and, more particularly, to a symmetrical railgun having at least four rails.

Known railguns comprise a single pair of conductive rails that surround a cavity and are disposed parallel to an axis. In operation, an electrically conductive material is placed in the cavity, and a current source is coupled to the two rails. Current flows through the rails for forming a magnetic field, and a current path is formed across the two rails through the electrically conductive material. The magnetic field interacts with the electric current flowing through the conductive material for creating an accelerating force which accelerates the electrically conductive material in the direction of the axis. At the same time, a repulsive force acts radially outwardly from the axis.

SUMMARY OF THE INVENTION

The present invention is directed to a symmetrical railgun which produces a higher ratio of acceleration force to repulsive force than known railguns. In one embodiment of the present invention, at least two rail paris of electrically conductive material are arranged at the same direction from a symmetry axis. The rails are parallel to the symmetry axis and are spaced from one another at the same mutual peripheral spacing through insulators for defining a smooth and straight acceleration cavity for an electrically conductive material.

The rails are connectable at one end alternatingly to the positive or negative side of a direct current energy source via a switch. When the switch is closed, current flows through the rails for forming magnetic fields which, in turn, create forces which act radially inwardly toward the symmetry axis. These forces focus the flow of the electrically conductive matter toward the symmetry axis, thus bringing about a substantial reduction in erosion and/or ablation of the insulators located between the rails. Attractive forces also arise between opposite rails in addition to repulsive forces, and components of the repulsive forces are canceled by the symmetrical arrangement of the rails. As a result, the ratio of the accelerating force to the repulsive force will generally always be higher for a railgun constructed according to the teachings of the present invention than with known railguns with only one pair of rails.

BRIEF DESCRIPTION OF THE DRAWINGS

FIGS. 1A–C are front, cross, and perspective views, respectively, of a particular embodiment of a symmetrical railgun according to the present invention;

DETAILED DESCRIPTION OF THE PREFERRED EMBODIMENTS

1. The symmetrical railgun consists of at least two pairs of conductive rails. In the case of two pairs of conductive rails these consist of four rails, which are made from a material, which is electrically conductive. These rails are arranged equidistant from a given symmetry axis and extend parallel to this axis (FIGS. 1A–C). These rails are alternatingly connected at one end to the positive or negative side of a device for storing electrical energy via a switch.

The rails are separated by an insulator and there is a symmetrical cavity or barrel along the symmetry axis, which extends from the symmetry axis up to the rails. Prior to the operation of the railgun, which is initiated by the closing of the switch, the end of the barrel which is connected to the power supply is filled with an electrically conductive material. This material can be a solid conductive body, the shape of which remains unchanged or only changes a little during the course of the acceleration, or it can be a body (preferably a metal foil or an aluminum foil, the shape of which changes very greatly or completely during the acceleration. After the closing of the switch an electrical current flows through the rails and the conductive material which is placed between the rails. This electrical current interacts with the magnetic field generated by the electrical current flowing in the rails and also in the electrically conductive body and the electrically conductive body is accelerated along the symmetrical barrel parallel to the symmetry axis.

If the electrically conductive body is a foil, then the latter will be vaporized and ionized by the current flowing through the foil and a magnetic field arises around the rails through which current is flowing and around the current in the vaporized and ionized material. The interaction between this magnetic field and the electrical current which is flowing generates a force on the rails and on the vaporized and ionized material (plasma). This plasma is accelerated by this force in the direction of the symmetry axis of the gun up to the end of the gun opposite to the end to which the electrical energy supply is connected. This accelerated plasma can be used to accelerate a body which is for example not electrically conductive. For this purpose this body which is to be accelerated is so introduced into the symmetrical cavity at the start of the acceleration process that it is located between the foil and the end of the gun to which the acceleration process is directed.

The body should in particular be so formed that it can be moved slidingly in the symmetrical cavity prior to and during the acceleration process and at the same time seals the part of the symmetrical cavity in which the accelerated plasma arises from the part of the symmetrical cavity which lies in front of the body in the direction towards the end of the gun to which the acceleration process is directed.

Figure 2A:
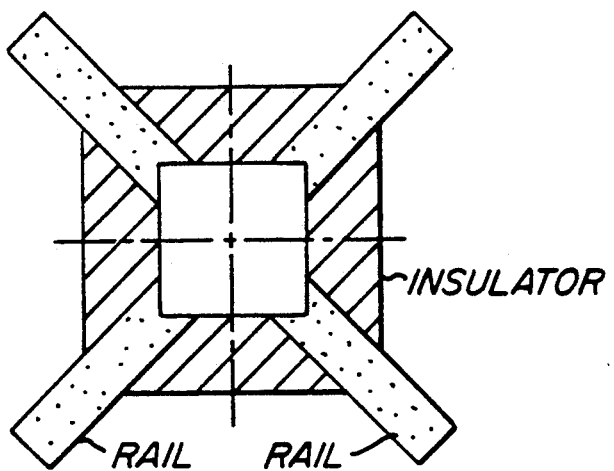
FIGS. 2A–C are cross sectional views of alternative rail configurations according to the present invention.
Figure 2B:
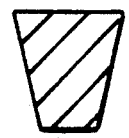
Figure 2C:
Figure 3A:
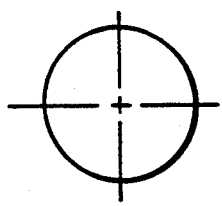
FIGS. 3A–D are cross sectional views of alternative acceleration cavity configurations according to the present invention.
Figure 3B:
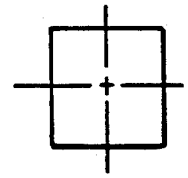
Figure 3C:
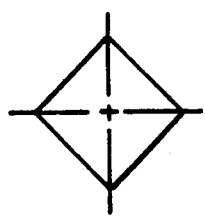
Figure 3D:
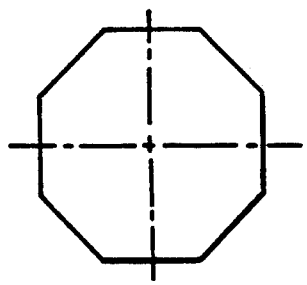

2. The symmetrical rail gun of claim 1 comprises rails of electrically conductive material and of insulators. Copper or brass is particularly suitable for the rails. In particular the rails should consist of the same material and should have an electrical resistance which is as low as possible while having a high mechanical strength. The rails can have any desired and also non-symmetrical cross section (FIGS. 2A–C). The cavity extending along the symmetry axis can have any desired cross-section. This cross-section can in particular be symmetrical (see FIGS. 3A–D). The circular cross-section is preferably suitable.

The insulators between the rails are so constructed that the current can only flow between the rails in the cavity. The insulators are so constructed that they withstand the forces which occur between the individual rails and prevent bending or deformation of the rails. Materials are preferably used which have a high electrical resistance and simultaneously a high mechanical strength and in which the thermal ablation due to the accelerating plasma and also the abrasion by the accelerated body is small.

3. The rails of the symmetrical railgun of claims 1 and 2 are alternately connected to the positive and negative side of a store for electrical energy. The connection is illustrated in FIG. 1A. At least four rails which are alternately connected to the positive and negative side of the energy supply are necessary to form a railgun as a symmetrical railgun. The symmetrical railgun can also consist of more than two pairs of rails.

4. The means for storing the electrical energy for the symmetrical railgun in accordance with claims 1, 2 and 3 must have the characteristic that it can make electrical energy available in a very short time.

An electrical capacitor or a plurality of capacitors combined together into a battery of capacitors and which are connected via one or more switches with the symmetrical railgun are in particular suitable for this purpose. If this switch is closed then the electrical energy stored in the capacitor or in the capacitor battery (bank) flows into the railgun. The circuit for this system is illustrated as an equivalent circuit in FIG. 4.

A homopolar generator followed by an inductor or an inductive storage system which is connected to a sufficiently powerful power supply can also be used for the energy supply for the symmetrical railgun. The stored energy lies for both means of energy supply between 10 kJ and 100 MJ. The maximum potential which occurs lies between 100 V and 100 kV, the current which is flowing lies between 10 kA and 10 MA.

Figure 4:
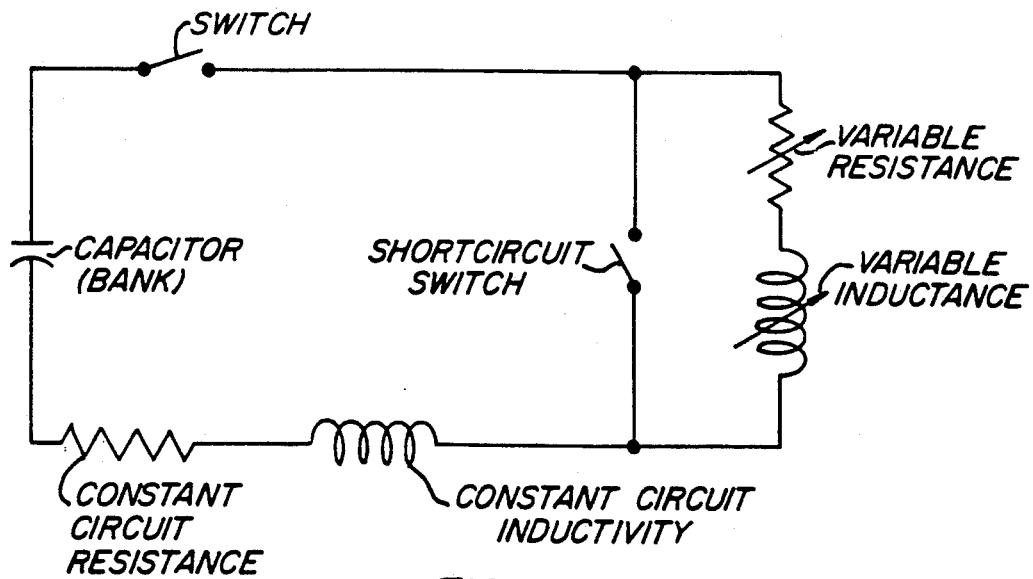
FIG. 4 is a schematic diagram of an equivalent circuit to the railgun according to the present invention.

The discharge must be actuated by at least one electrical switch. This can contain an open or closed spark gap. A mercury vapor switch (ignitron) is particularly suitable. A short circuit switch can be built into the current circuit, as indicated in the equivalent circuit in FIG. 4. This switch is termed a "crow bar switch" in specialist language. This switch is closed when the current which flows to the railgun has reached its highest value. In this way swinging through of the oscillating circuit shown in FIG. 4 is prevented as far as possible. The duration of the acceleration process and the achievable end speed increase, and the degree of efficiency of the gun improves. Moreover, a reignition of an electrical arc at the start of the symmetrical railgun and also at the end of the railgun are strongly prevented hereby. This reignition would short circuit the electrical current which would otherwise flow through the electrically conductive body to be accelerated or through the accelerating plasma.

Figure 5:
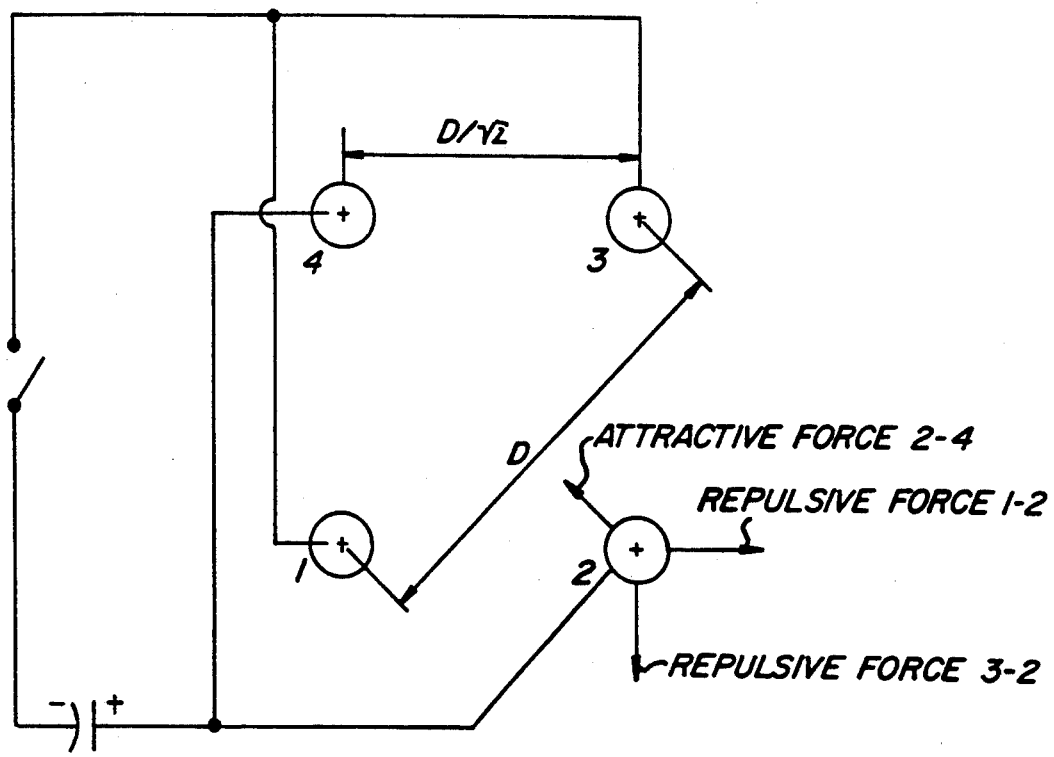
FIG. 5 is a diagram showing attractive and repulsive forces which arise among the rails when current flows through them in the manner according to the present invention.
Figure 6A:
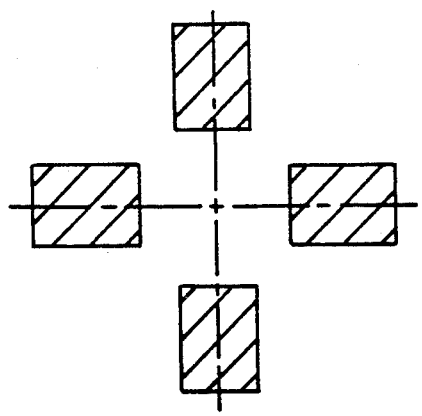
FIGS. 6A–F are cross sectional views of alternative embodiments of railgun bodies according to the present invention.
Figure 6B:
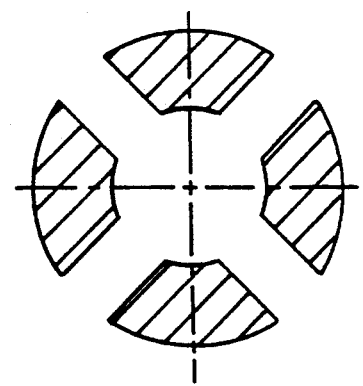
Figure 6C:
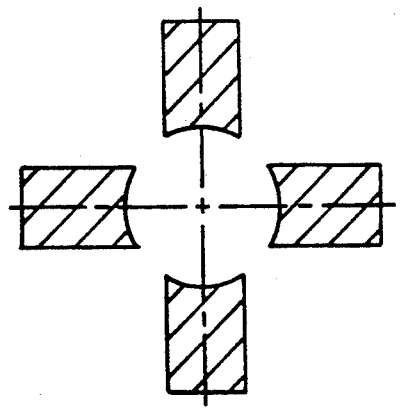
Figure 6D:
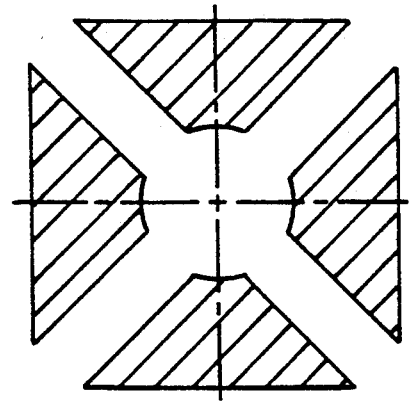
Figure 6E:
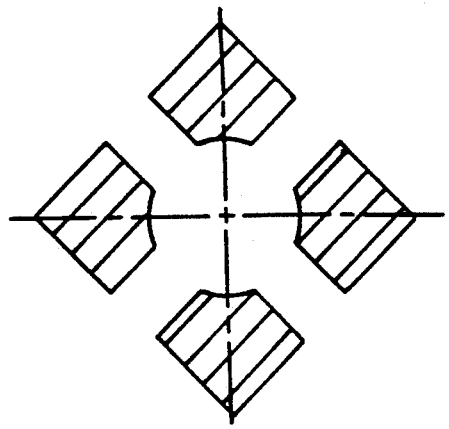
Figure 6F:
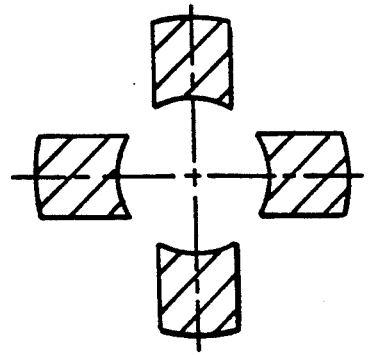

5. A symmetrical railgun in accordance with claims 1, 2, 3 and 4 has in particular the characteristic that, as shown in FIG. 5, attractive forces also arise between the individual guide rails in addition to repulsive forces. In addition components of the repulsive forces are cancelled by the symmetrical arrangement of the guide rails. For the same total electrical current which flows to the gun one half of the electrical current will flow per rail in a symmetrical railgun with two pairs of rails as would flow in a customary railgun with only one pair of rails and the repulsive force, i.e. the force which acts radially outwardly from the line of symmetry of the gun, is four times lower when the guide rails are approximated by current paths of any desired lengths than with customary railguns with one pair of rails, when the spacing of the two rails of a customary rail gun is the same as the diagonal D of the symmetrical railgun shown in FIG. 5.

At the same time the accelerating force on the body to be accelerated is only half as large in this case with the symmetrical railgun as with the customary rail gun with one pair of rails.

Thus, in this case the symmetrical railgun has a ratio of acceleration force to impulsion force which is twice as large. The ratio of the accelerating force to the repulsive force will generally always be higher for the symmetrical railgun because of its symmetrical construction than with a customary railgun with one pair of rails.

6. The symmetrical railgun in accordance with claims 1 to 5 can have different constructions depending on the particular combination, of rail cross-sections, as are for example shown in FIGS. 2A–C, and of cavity cross-sections such as are shown in FIGS. 3A–D. Six examples for such constructions are given in FIGS. 6A–F. A construction with a cross-sectional area of the electrodes which is as small as possible is particularly favourable.

Figure 7:
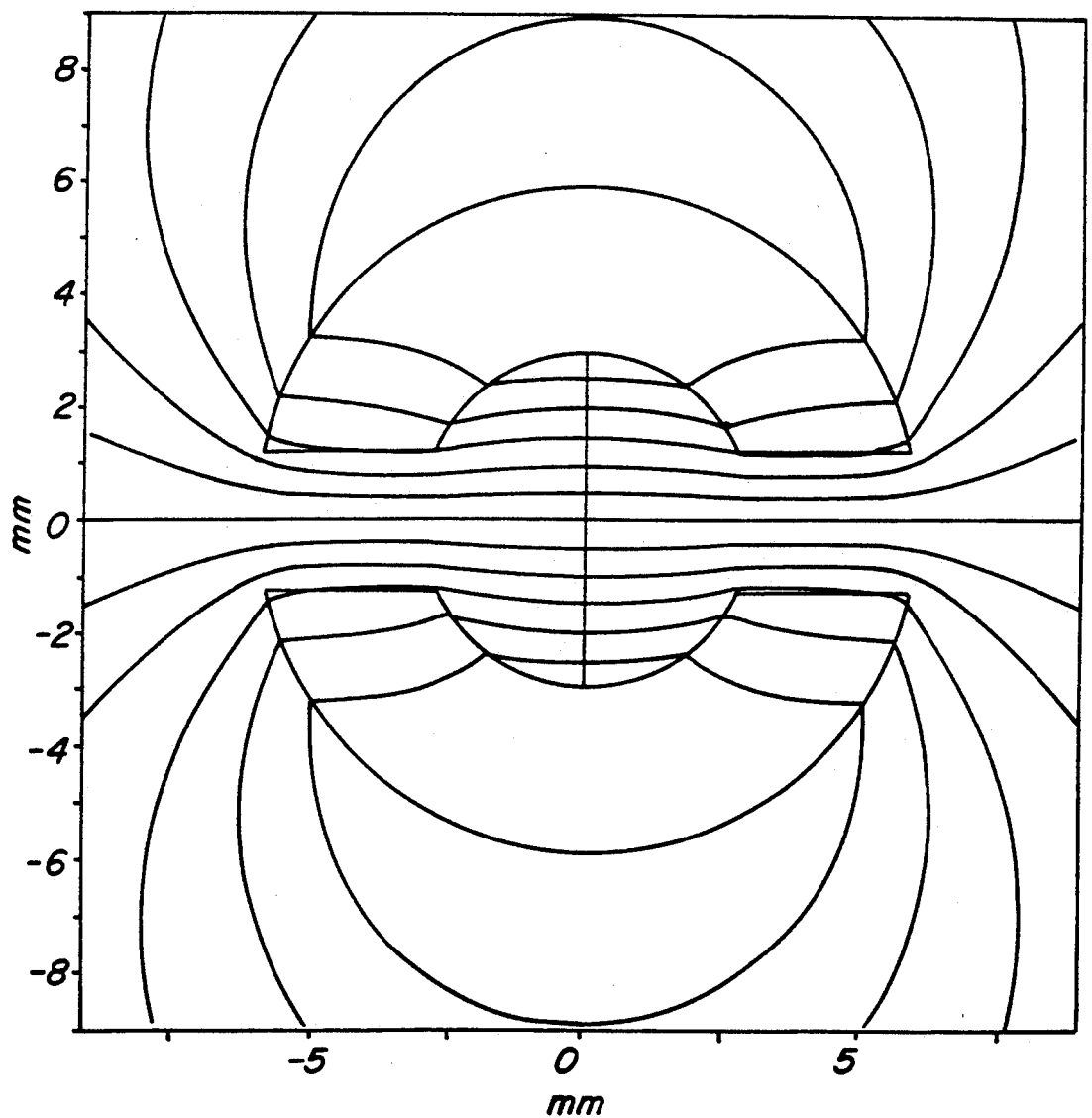
FIG. 7 is a cross sectional view of a known railgun showing magnetic flux and a current path generated when in operation.

7. The comparison of a customary railgun with a pair of rails and a symmetrical railgun with two pairs of rails is carried out in FIGS. 7, 8 and 9.

All three arrangements are produced from a circular tube with the same outer diameter and the same inner diameter. The dimensions are collated in table 1. Together with the cross-sections and the arrangements of the guide rails there are in each case shown the magnetic field lines and also the electrical current between the guide rails which is approximated by a current path or several current paths.

The same total electrical current flows in each rail arrangement and then divide itself up between either two or four rails. The results of the computations are collated in table 2. They show that on comparing special embodiments of rails or rail pairs one can fall short of exceed the ratio determined under simplified assumption of the accelerating force to the repulsion force.

Figure 8:
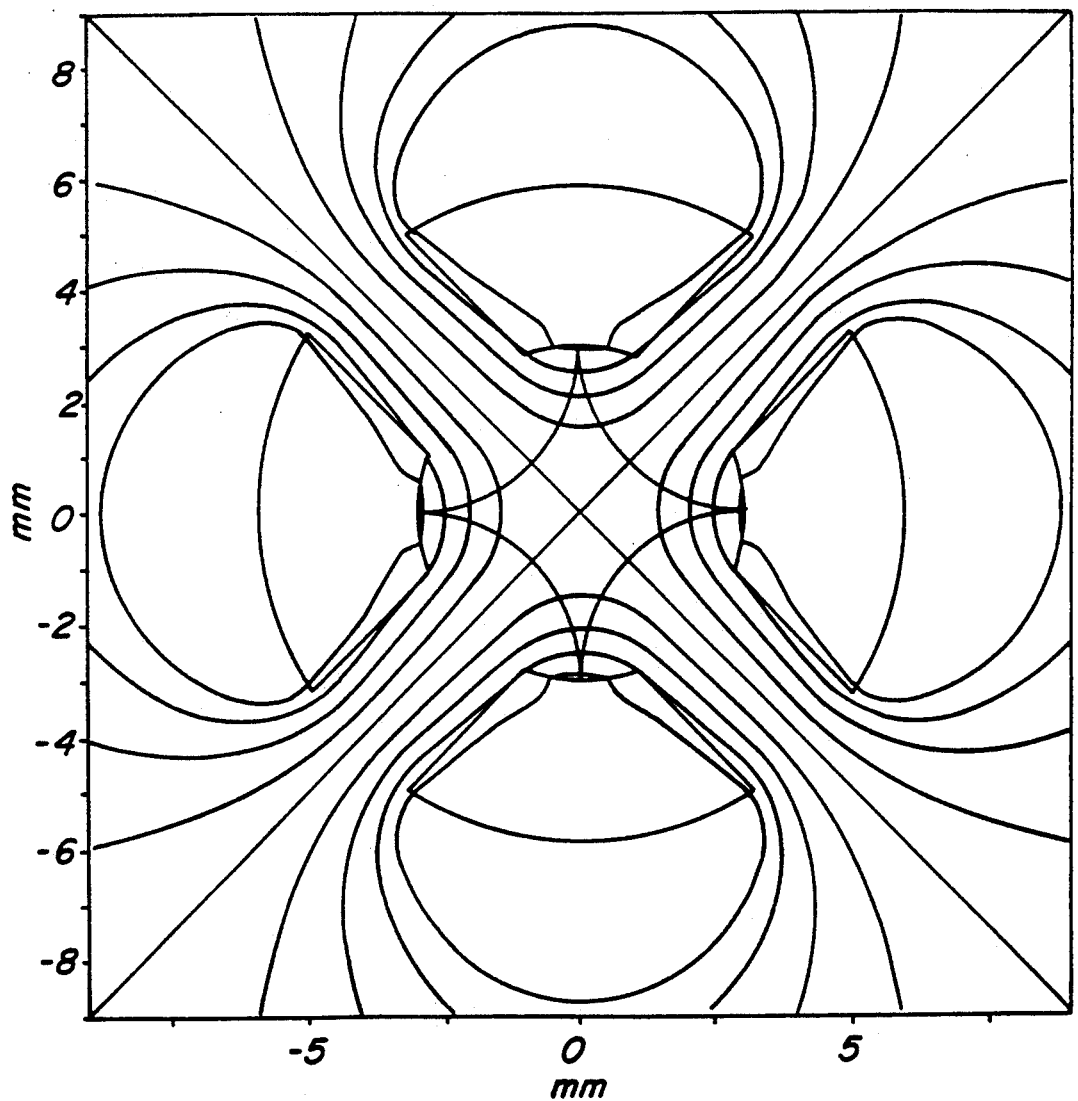
FIG. 8 is a cross sectional view of the inventive railgun according to FIG. 6B showing magnetic flux and current paths generated when in operation.
Figure 9:
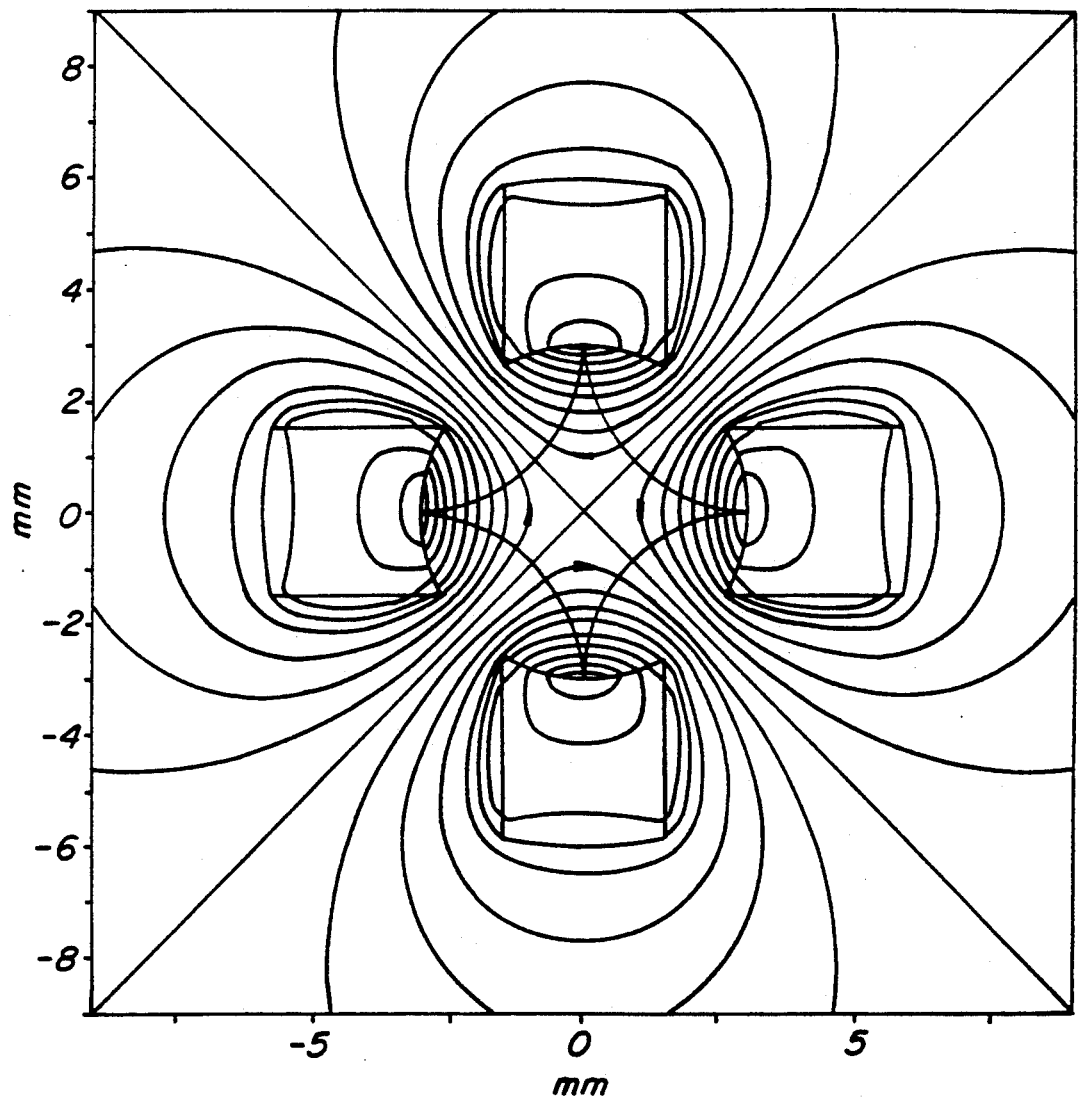
FIG. 9 is a cross sectional view of the inventive railgun according to FIG. 6F showing magnetic flux and current paths generated when in operation.

8. The symmetry of the rails in the symmetrical railgun leads to arrangements of magnetic field and current flux in the symmetrical cavity such as are shown in FIGS. 8 or 9. This results in forces which act radially inwardly toward the symmetry axis and which lead in the arrangement of claim 1 with an accelerating plasma to a focussing of the plasma flow to the symmetry axis.

The erosion and/or ablation of the insulators located between the rails.

I claim:

1. A symmetrical railgun characterized in that at least two rail pairs of electrically conductive material are arranged at the same distance from a predetermined central symmetry axis parallel to the symmetry axis and spaced from one another at the same mutual peripheral spacing through insulators for defining an acceleration cavity for an electrically conductive and electrically neutral material, each insulator having one of the rails disposed on each peripheral side thereof; and in that the rails are connectable at one end alternatingly to the positive or negative side of a means for exclusively storing direct current electrical energy via a switch means for discharging the direct current storing means in a very short time so that current flows through the conductive material which acts as a common current-flowing junction between each pair of rails in response to the switch means, wherein the cavity is defined by a smooth peripheral surface substantially straight in the direction of the symmetry axis, and wherein the surface of each rail facing the axis is at the same radial distance from the axis along substantially the entire length of that rail.

2. Railgun in accordance with claim 1, characterized in that the cavity is made symmetrical in cross-section, in particular circular, square or octagonal and forms an acceleration space for the electrically conductive material which is present either in solid form which does not change, at least substantially, during acceleration or is present in a form which changes very greatly or completely during acceleration.

3. Railgun in accordance with claim 1 characterized in that the conductive material comprises a foil convertible through the flow of current into the vaporized an ionized plasma state; and in that a body, in particular an electrically non-conducting body is movably arranged in the cavity prior to and during the acceleration process and seals the plasma space off in the direction towards the end of the gun.

4. Railgun in accordance with claim 1 characterized in that the individual rails consist of the same material, in particular of copper or brass.

5. Railgun in accordance with claim 1, characterized in that the rails have a symmetrical cross-section, in particular in the shape of a rectangle, trapezium or ring sector, with the region disposed at the cavity side in each case being matched to the local cavity shape.

6. Railgun in accordance with claim 1, characterized in that the rails together with the insulators which lie between them, in particular form a cylindrical or rectangular overall structure.

7. Railgun in accordance with claim 1, characterized in that the rails are disposed at the corner regions of a polygonal cavity.

8. Railgun in accordance with claim 1, characterized in that the insulators comprise a material which has at the same time a high electrical resistance and a high mechanical strength and for which the thermal ablation due to the acceleration plasma and also the abrasion by the accelerated body is small.

9. Railgun in accordance with claim 1, characterized in that the means for storing electrical energy consists of a capacitor battery or a homopolar generator with an inductor connected thereafter.

10. Railgun in accordance with claim 1, characterized in that the switch means includes an open or closed spark gap.

11. Railgun in accordance with claim 10, characterized in that the switch means includes an ignition.

12. Railgun in accordance with claim 1, characterized in that a short circuit switch is arranged in the current circuit between the energy source and the rails, with the short circuit switch then being closed when the current flowing through the gun has achieved its highest value.

13. Railgun in accordance with claim 1, characterized in that the area contribution of the rails in the cross-section of the total structure is larger than the area contribution of the insulators.

14. A symmetrical railgun comprising:
first and second pairs of elongated rails formed of an electrically conductive material, each rail being disposed substantially equidistant and parallel to a central axis, each rail having substantially the same peripheral spacing from one another, and wherein the surface of each rail facing the axis is at the same radial distance from the axis along substantially the entire length of that rail;
an insulator disposed between the first and second pairs of rails in the peripheral direction for defining a cavity extending along the axis; and
means for flowing only direct current through the first and second pairs of rails through a common current flowing junction disposed within the cavity for forming a magnetic field which creates a force directed radially inwardly toward the axis.

15. The railgun according to claim 14 wherein the cavity is defined by a smooth peripheral surface.

16. The railgun according to claim 15 wherein the peripheral surface is formed by the insulator and exposed surfaces of the rails.

17. A symmetrical railgun comprising:
first and second paris of elongated rails formed of an electrically conductive material, each rail being disposed substantially equidistant and parallel to a central axis, each rail having substantially the same peripheral spacing from one another, and wherein the surface of each rial facing the axis is at the same radial distance from the axis along substantially the entire length of that rail;
an insulator disposed between the first and second paris of rials in the peripheral direction for defining a cavity extending along the axis;
electrically conductive matter disposed within the cavity; and
current means, coupled to the first and second pairs of rails, for flowing a direct current derived from an energy source through the first and second pairs of rails through the electrically conductive matter for forming a magnetic field which interacts with the conductive matter for accelerating the conductive mater in the axial direction, wherein the electrically conductive matter acts as a common current-flowing junction between the first and second pairs of rails.

18. The railgun according to claim 17 wherein the cavity is defined by a smooth peripheral surface.

19. The railgun according to claim 18 wherein the peripheral surface is formed by the insulator and exposed surfaces of the rails.

20. The railgun according to claim 17 wherein the electrically conductive matter comprises a plasma.

21. The railgun according to claim 20 further comprising a nonconductive projectile disposed in front of the plasma, the projectile being shaped for sealing the plasma from the portions of the cavity in front of the projectile so that the plasma accelerates the projectile in the axial direction and in a straight line in response to the current.

22. The railgun according to claim 17 wherein the electrically conductive matter comprises a foil which is vaporized by the current into an ionized plasma.

23. The railgun according to claim 22 further comprising a nonconductive projectile disposed in front of the electrically conductive matter, the projectile being shaped for sealing the portions of the cavity containing the electrically conductive matter from the portions of the cavity in front of the projectile so that the electrically conductive matter accelerates the projectile in the axial direction in response to the current.

24. The railgun according to claim 17 wherein the cavity is defined by a smooth peripheral surface formed by the insulator and exposed surfaces of the rails.

25. The railgun according to claim 17 wherein the current means comprises short circuit means, disposed between the energy source and the first and second pairs of rails, for short-circuiting current flowing to the rails when the current flowing through the rails has achieved a maximum value.

26. The railgun according to claim 17 wherein the current means is coupled to the first and second pairs of rails so that a current path is formed between each adjacent pair of rails through the electrically conductive matter.

* * * * *